United States Patent [19]

Wang

[11] 3,843,588
[45] Oct. 22, 1974

[54] COATING AND COATED PRODUCTS
[75] Inventor: Tsu Huai Wang, Hockessin, Del.
[73] Assignee: Wilmington Chemical Corporation, Wilmington, Del.
[22] Filed: Dec. 20, 1972
[21] Appl. No.: 316,921

Related U.S. Application Data
[63] Continuation-in-part of Ser. No. 72,818, Sept. 16, 1970, abandoned, which is a continuation-in-part of Ser. No. 602,545, Dec. 19, 1966, Pat. No. 3,582,423.

[52] U.S. Cl... 260/32.6 N, 117/135.5, 117/139.5 A, 117/161 KP, 260/75 NH, 260/77.5 SP, 260/77.5 AM
[51] Int. Cl............................................. C08k 1/40
[58] Field of Search ... 260/32.6 N, 77.5 SP, 75 NH, 260/77.5 AM

[56] References Cited
UNITED STATES PATENTS

| | | | |
|---|---|---|---|
| 2,933,477 | 4/1960 | Hostettler | 260/77.5 AN |
| 3,115,384 | 12/1963 | Cacella et al. | 260/77.5 SP |
| 3,188,302 | 6/1965 | Lorenz | 260/77.5 AM |
| 3,252,848 | 5/1966 | Borsellino | 260/77.5 |

Primary Examiner—Melvyn I. Marquis
Attorney, Agent, or Firm—Connolly and Hutz

[57] ABSTRACT

Coating pliable porous substrates like foams and textiles with tough pliable protective layers prepared from linear 700 to 5,000 molecular weight hydrophobic dialcohols having an alcohol group at each end of the molecule which dialcohol is reacted with diisocyanate to attach free diisocyanate-carrying groups at each end, and then reacting the resultant material with slight excess of p,p'-methylene dianiline.

6 Claims, No Drawings

COATING AND COATED PRODUCTS

This application is a continuation-in-part of application Ser. No. 72,818, filed Sept. 16, 1970 (subsequently abandoned), which in turn is a continuation-in-part of application Ser. No. 602,545, filed Dec. 19, 1966 (granted June 1, 1971 as U.S. Pat. No. 3,582,423).

Among the objects of the present invention is the provision of novel coated pliable and porous substrates that have particularly desirable characteristics, as well as compositions and coating methods for producing such articles.

The above as well as additional objects of the present invention will be more clearly understood from the following description of several of its exemplifications.

According to the present invention a soft pliable substrate has a tough elastomeric coating of a condensate of linear hydrophobic polymer blocks having a molecular weight from about 700 to about 5,000 and each end of these blocks terminates in an alcohol group, the blocks being first reacted with an organic diisocyanate and then condensed with p,p'-methylene dianiline, the molar ratio of the isocyanate group to the hydroxyl groups being from about 1.1:1 to about 2:1, the diamine being in an amount about 2 to 6 percent in excess of that required for each amine group to react with an isocyanate group, and the condensate having a molecular weight between about 40,000 and about 200,000. These coatings are exceptionally yieldable as well as tough, even though they are not plasticized.

The blocks are preferably polyester or polyglycol blocks, but they can have other structures, such as polysiloxane or polyacetal configurations. Such hydroxyl-terminated blocks react with the excess of diisocyanate to increase their length and change their terminations from hydroxyl to isocyanate. It is preferred to have the lengthening relatively modest as by having the isocyanate to hydroxyl mol proportion between about 1.5:1 and 2:1. Mol proportions below 1.5:1 cause the lengthening to be accompanied by a great deal of coupling of blocks together. Blocks that have less than about four carbons on an average between hydrophilic groups such as oxygen in the linear chain, are considered hydrophilic and are not desired because their hydrophilic character carries over to the final product. Thus polypropylene glycols and polyethylene glycols should be avoided although polyesters of these glycols with acids having at least six carbons are quite suitable.

The excess of amine is highly critical and is preferably only about 4 to 5 percent. Excesses smaller than about 2 percent give condensates whose solubilities are very low so that they are difficult to apply. Excesses greater than 6 percent on the other hand, produce condensates that tend to be weak and tacky, and accordingly undesirable.

The condensates resulting from a 4 to 5 percent excess of amine are soluble to the extent of at least about 15 percent by weight in dimethyl formamide or dimethyl formamide mixed with lower ketones such as those having up to about 9 carbon atoms per molecule. This solubility enables these condensates to be readily applied from solution. On porous substrates such as foams or textiles, however, the coating solution tends to be excessively absorbed into the interior of the substrate. In order to keep from materially changing the characteristics of the substrate or from using too much coating material, the solution can be first applied on a temporary carrier where it is dried to form the outer layer of the coating, and then a second coat, usually thinner, applied and used as an adhesive to bond the coating to the porous substrate. The solvent remaining in the adhesive layer can be evaporated through the porous substrate. The dried coating can also be adhered to a foam substrate that has had its surface subjected to direct flame for a period short enough to keep from damaging the foam but long enough to render the surface adherent. Also the foam can be formed on the precast coating, as by pouring the foam-producing liquid mixture over the dried coating on the temporary carrier. A single undried or partially dried coating layer can alternatively be pressed against the substrate and the drying then completed to produce the final product.

The temporary carrier preferably has a non-adherent surface so that it can be readily separated from the coating after all solvent is evaporated, for instance. A thin layer of a parting material such as a silicone oil or polytetrafluoroethylene or polyethylene on the carrier is effective for this purpose. A polyethylene film itself also makes a good temporary carrier. The temporary carrier can also be made readily removable by other techniques, such as having the carrier of material that dissolves in a solvent in which the coating is not soluble, or that can be melted away from the coated substrate.

The p,p'-methylene dianiline

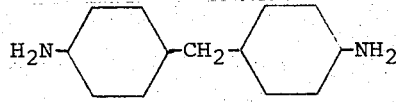

gives outstanding results in the above combination. Other primary aromatic dianilines such as 1,1-ethylene-p,p'-dianiline, 2,2-propylene-m,m'-dianiline, 1,2-ethylene-p,p'-dianiline, 4,4'-methylene-bis-(3-methyl-aniline), 1,1,1-trifluoro-ethylene-2-(4')-aniline-2-(4'')-2'''-ethyl-aniline, etc., having molecular weights up to 400 can also be used but are not preferred.

Any residual amino groups in the final condensate can be rendered less active, as by treatment of the condensate with a little formaldehyde or with uncured formaldehyde resins like urea-formaldehyde and phenol-formaldehyde resins. In addition, or in lieu of such treatment, a little monoethanolamine can be substituted for about 1 percent of the diamine before it is reacted.

A small amount of cross-linking agent such as up to 2 percent of a triisocyanate based on the mol concentration of the diamine can also be present in the condensation reaction, but is preferably avoided where the condensate is to be made highly extensible, as for coating a very yieldable foam. Such a triisocyanate is desirably made by reacting trimethylolpropane or other triols having molecular weights up to about 5,000, with a diisocyanate in molar proportions of about 1.5 to 2 diisocyanate groups for each hydroxyl group. Tetrols can be similarly reacted with diisocyanates, and triisocyanates can be used in place of the diisocyanates in either of these reactions.

The following working examples will further illustrate the present invention, all parts being by weight unless otherwise specified.

EXAMPLE I

Formulation:

| Step 1: | parts |
|---|---|
| Polyethylene glycol adipate having terminal OH groups and an OH content of 1.5% | 74.00 |
| p,p'-methylenediphenyl diisocyanate | 17.75 |
| dimethylformamide (dry) | 93.75 |
| Step 2: | |
| p,p'-methylene dianiline | 7.75 |
| dimethylformamide (dry) | 211.75 |

Procedure:
Step 1:
Purge a reactor with nitrogen and charge the polyester into it. Heat the charge to 60°–70°C and hold until it is all melted. Charge the isocyanate into the melted polyester, raise the temperature to 100°–110°C and hold at this temperature for 1 hour. Then add the dimethylformamide, mix well and cool to room temperature.

Step 2:
Dissolve the p,p'-methylene dianiline in the dimethyl formamide, charge the resulting solution into the mixture resulting from Step 1, and mix well for 1–2 hours.

The final product is a solution containing about 25 percent by weight of the condensate. This solution is applied as a layer about 10 mils thick to a polytetrafluoroethylene-coated release paper that is patterned by embossing to impart a leather-like grain effect to any material cast against the paper. The paper carrying the solution is held for about 2 minutes at 250°F to evaporate the solvent. A second layer of solution about 3 mils thick (wet) is applied over the dried layer and a soft polyester polyurethane foam pad is then pressed against the undried second layer. The laminated combination is dried for two minutes at 250°F after which the release paper is pulled away. The paper comes away cleanly leaving a foam pad with a thin skin (about 3 mils thick) that is exceedingly tough, yet quite stretchy. The coated foam pad has all the resiliency and softness it had before it was coated notwithstanding the absence of plasticizer in the coating. The coated pad is highly resistant to abrasion and its surface is sealed against absorption of water or gas. It is also resistant to dry cleaning solvents and is not tacky. Its characteristics are better noted from the following numerical values:

| Tensile strength | 6000 psi |
|---|---|
| Elongation | 600% |
| Abrasion resistance (mgs. lost/ 1000 cycles - Taber CS-17 wheel) | 0.5 |

EXAMPLE II

Formulation:

| Step 1: | parts |
|---|---|
| Polypropylene (1,2) glycol adipate having terminal OH groups and an OH content of 1.6% | 200.00 |
| 2,4-toluene diisocyanate | 28.25 |
| methyl isobutyl ketone | 57.05 |
| Step 2: | |
| p,p'-methylene dianiline | 14.15 |
| dimethylformamide (dry) | 508.55 |
| carbon black | 3.00 |

The procedure for this Example is exactly like that for Example I except that the polyester of Example II is normally liquid, it is mixed with the diisocyanate at a temperature below 40°C for an hour and the heating of this mixture is for two hours at 75°–80°C.

The coating mixture of Example II is ready for immediate use and has about 30 percent by weight of the condensate. It can be applied in the same way as described above in connection with Example I to form a 5 mil thick (wet) coating adhered onto a knitted nylon rayon textile suitable for making ladies' gloves (40 by 35 denier filament). The thinner coating layers means that the solvent evaporation on the release paper can be effected in about one minute after which the textile can be pressed against the sticky condensate. The solvent evaporation continues during the pressing operation and should be substantially complete after another half minute or so. Very durable gloves are made from this coated product. Such gloves look and wear like leather.

The following are some measured characteristics of the pigmented coating:

| Tensile strength, psi. | 259 |
|---|---|
| 300% modulus, psi. | 205 |
| 100% modulus, psi. | 187 |
| 2% modulus, psi. | 42.6 |
| Elongation, % | 740 |
| Elongation set, % | 62 |
| Split tear, pi. | 63.2* |
| Tensile at yield, psi. | 85 |
| Elongation at yield, % | 11 |

*Tear was more like a tensile.

The very low modulus at 2 percent elongation shows that the coating has a very desirable soft hand.

EXAMPLE III

Formulation:

| Step 1: | |
|---|---|
| Poly diethylene glycol adipate having terminal OH groups and an OH content of 1.7% | 92.3 parts by weight |
| p,p'-methylenediphenyl diisocyanate | 23.08 parts by weight |
| dimethylformamide (dry) | 28.61 parts by weight |
| Step 2: | |
| p,p'-methylene dianiline | 9.51 parts by weight |
| dimethylformamide (dry) | 346.5 parts by weight |

The procedure for this example is exactly like that for Example 1. The polyester is normally liquid. It is heated, however, to obtain melting of the diisocyanate used.

EXAMPLE IV

Formulation:

| Step 1: | parts |
|---|---|
| Polytetramethylene glycol with an OH content of 1.7% | 2100.0 |
| 2,4-toluene diisocyanate | 266.5 |
| methyl ethyl ketone | 542.5 |
| dimethylformamide | 2567.0 |
| Step 2: | |
| p,p'-methylene dianiline | 99.5 |
| methyl ethyl ketone | 105.0 |
| dimethylformamide (dry) | 1593.5 |

Procedure:
Step 1:
Purge the reactor with nitrogen and charge the polytetramethylene glycol which has been premelted, together with the isocyanate and MEK. Raise the temperature to 70°–75°C and hold for 3 hours, then cool to room temperature.

Step 2:

Dissolve the p,p'-methylene dianiline in the solvent mixture, and charge the amine solution into the prepolymer solution of Step 1. Mix well for 1–2 hours at room temperature.

The following diol blocks can be substituted in equimolar amounts for the polyester of Example I, to give similarly desirable products:

polytetramethylene glycol having a molecular weight of 2,500, epsilon caprolactone that has been polymerized to a molecular weight of 4,400.

Similarly the diisocyanate of Example II can be replaced by the following without significantly affecting the product:

p,p'-methylenediphenyl diisocyanate, hydrogenated p,p'-methylenediphenyl diisocyanate, bis(2-isocyanatoethyl) fumarate.

All the reactants used to make the product of the present invention can be simple compounds, that is having no substituents other than hydrocarbyl groups, or they can have substituents like fluorine, chlorine or urethane or urea groups or the like that do not interfere with the desired reactions so that the alcohol groups of the initial blocks, the isocyanate groups of the diisocyanate, and the amino groups of the diamine are the sole reactive groups. It is preferred that the diisocyanate have a molecular weight no larger than about 500.

While as shown in the examples up to about 30 percent of the solvent by weight can be a lower ketone, the solvent is essentially dimethyl formamide. In order to practice this invention with the ingredient proportions given in the Examples, the solvents should be free of contaminants which react either with the isocyanate or with the amine. Thus the dimethyl formamide should be fresh and have very little odor.

Ketones by themselves, and other conventional solvents will not dissolve enough of the condensate to make it feasible to apply the coatings from solution. Indeed the coatings of the present invention are highly desirable because of their resistance to solvents. They are only attacked by dimethyl formamide and dimethyl acetamide.

The condensates of the present invention are fully cured when they are initially prepared, so that the solvent used for application to substrates must adequately dissolve that fully cured material.

In general the coatings of the present invention can have thicknesses of from about 1 to about 30 mils. Greater thicknesses do not add significantly to the protection these coatings provide and unduly extend the time required to dry the coatings. It is a feature of the present invention that wet coatings up to about 20 mils thick can be applied on a production line moving at the rate of 12 linear yards or more per minute to form a product that can be immediately used or shipped.

The thinner coatings are best applied by roller coating or spraying and the thicker by knife coating or flow coating. The temporary carriers can be provided with any kind of surface finish, both grained and ungrained. Because of the absence of plasticizer the coatings of the present invention do not undergo perceptible change in characteristics upon aging except for the conventional darkening where the coatings are very light in color. A small amount of pigment such as 1 to 6 percent carbon black, phthalocyanine blue, chrome green or red iron oxide can be mixed into coating formulations to make them more decorative and also mask out such color.

The darkening of the coatings can also be reduced by the use of isocyanates and amines in which the functional groups are not directly substituted on aromatic rings. Thus hexamethylene diisocyanate, hydrogenated p,p'-methylene diphenyl diisocyanate and ortho, meta and para bis(isocyanatomethyl) benzene produce condensates with less tendency to darken, as do diamines such as ethylene diamine, hydrazine and hexamethylene diamine. It should be noted however that the use of such diamines causes the condensate to be less tough and less abrasion-resistant.

The coated foams and fabrics of the present invention are well suited for upholstery materials, particularly in automobiles, airplanes and the like.

Obviously many modifications and variations of the present invention are possible in the light of the above teachings. It is, therefore, to be understood that within the scope of the appended claims the invention may be practiced otherwise than as specifically described.

What is claimed:

1. A tough elastomeric condensate of linear hydrophobic polymer blocks having a molecular weight from about 700 to about 5000, each end of these blocks terminating in an alcohol group, the blocks being first reacted with an organic diisocyanate and then condensed with p,p'-methylene dianiline, the molar ratio of the isocyanate group to the hydroxyl groups being from about 1.1:1 to about 2:1, the p,p'-methylene dianiline being in an amount about 2 to 6 percent in excess of that required for each amine group to react with an isocyanate group, and the condensate having a molecular weight between about 40,000 and about 200,000.

2. The condensate of claim 1 in which the linear blocks are polyester blocks.

3. The condensate of claim 1 in which the linear blocks are polyglycol blocks having at least four carbons in each glycol.

4. The condensate of claim 1 in which the linear blocks are polytetramethylene glycol blocks.

5. The condensate of claim 1 in which the blocks have a molecular weight of about 2,000, the molar ratio of the isocyanate groups to the hydroxyl groups is between 1.5:1 and 2:1, the p,p'-methylene dianiline excess is between 4 and 5 percent, and the condensate has a molecular weight between 50,000 and 100,000.

6. A solution of the condensate of claim 1 in a solvent that is essentially dimethyl formamide, said solution having at least about 15 percent condensate by weight.

* * * * *

UNITED STATES PATENT OFFICE
CERTIFICATE OF CORRECTION

Patent No. 3,843,588　　　　　　　　Dated October 22, 1974

Inventor(s) Tsu Huai Wang

It is certified that error appears in the above-identified patent and that said Letters Patent are hereby corrected as shown below:

Column 4, Example IV, second line of entries in Step 2, "105.0" should be --1051.0--.

Column 6, line 22, --very-- should be inserted after "are".

Signed and sealed this 31st day of December 1974.

(SEAL)
Attest:

McCOY M. GIBSON JR.　　　　　　C. MARSHALL DANN
Attesting Officer　　　　　　　Commissioner of Patents